Patented Nov. 20, 1945

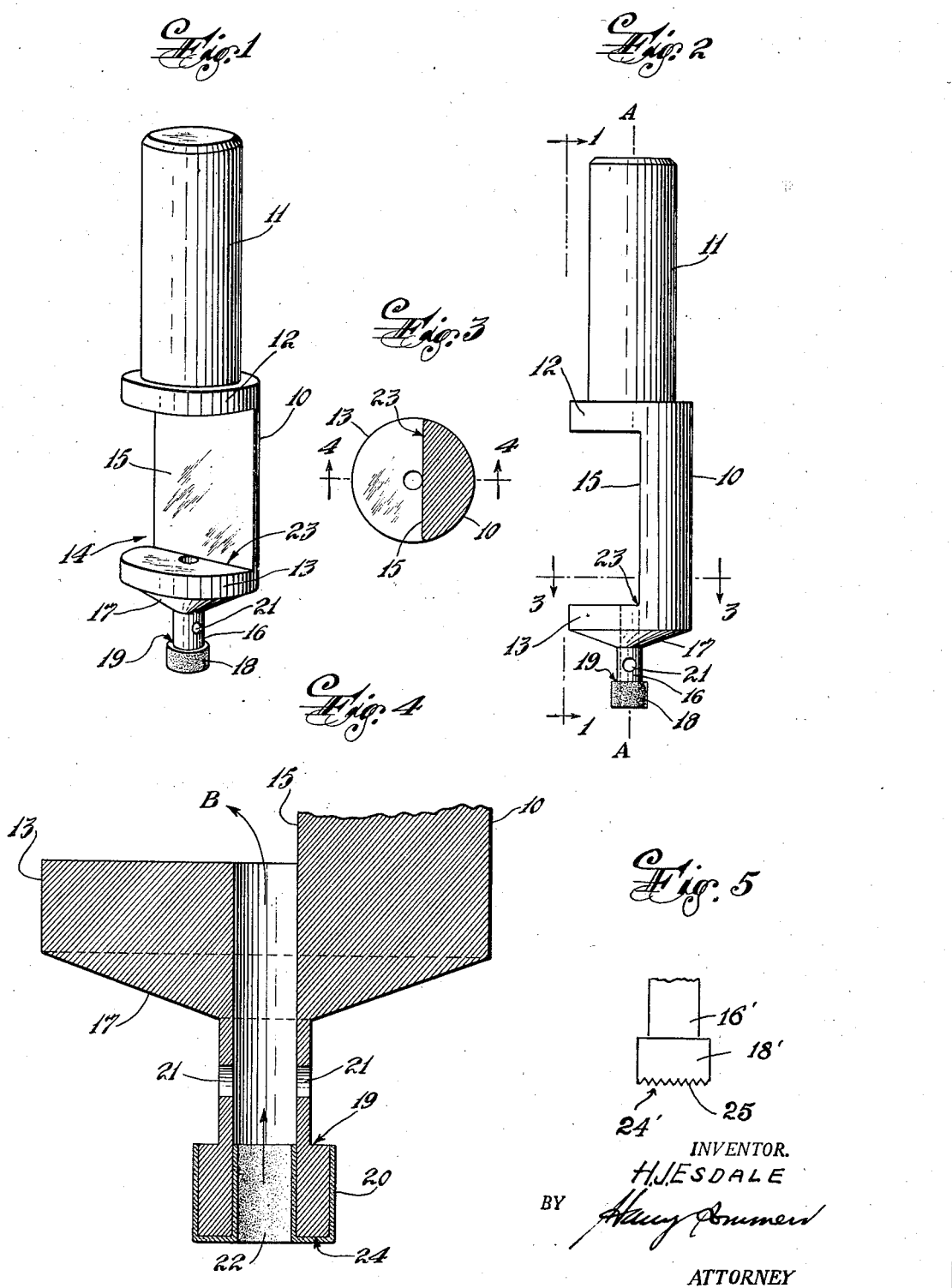

2,389,188

UNITED STATES PATENT OFFICE 2,389,188

DRILL

Harry J. Esdale, Union, N. J.

Application March 17, 1945, Serial No. 583,346

2 Claims. (Cl. 125—20)

This invention relates to improvements in drills, and is particularly adapted for use in connection with the drilling of apertures in lenses, spectacles and the like, for receiving bolts and other attaching devices.

It is presently customary, in the drilling of apertures in lenses, for example, to first drill the aperture proper. This operation, with the equipment presently used, results in an aperture of highly roughened outline; it is customary to resort to a second operation with another tool for the purpose of endeavoring to ream the aperture to a less roughened form. After subjecting the lenses or other products to the operations just referred to, the resultant apertures are ordinarily of such irregular outline that it is necessary to provide washers to cover the same or to provide enlargements on the securing means for that purpose.

It is the object of this invention to provide a drill by means of which spectacles, lenses, plastic products and other articles to be provided with apertures may be subjected to a single operation to provide apertures of uniform diameter therein.

It has been found that by the use of the drill herein described and illustrated in the drawing, on lenses for example, apertures of uniform diameter and of smooth finish have been provided in a single operation. The device, therefore, possesses substantial practical and commercial value, and fills a distinct want in the industry.

In the drawing the drill has been shown substantially enlarged for the sake of clarity; it will be understood that the structure thereof forming the subject matter of the claims herein may be made in any size and for use in connection with any material, within the scope of this invention.

These and other advantageous objects, which will later appear, are accomplished by the simple and practical construction and combination of parts hereinafter described and more particularly shown in the drawing, illustrating embodiments of my invention, and in which:

Fig. 1 is a perspective view of a drill embodying my invention taken on line 1—1 of Fig. 2, Fig. 2 is a side elevational view thereof, Fig. 3 is a horizontal plan view, partly sectional, taken on line 3—3 of Fig. 2, and Fig. 4 is an enlarged fragmentary, vertical sectional view taken on line 4—4 of Fig. 3.

In the embodiment shown in the drawing, the drill comprises a body portion 10 provided with upper and lower ledge portions 12 and 13 depending therefrom in spaced relation and defining therebetween a recessed portion 14, further defined by the inner wall 15 of the body portion 10 connecting the ledge portions 12 and 13 at a point offset from the longitudinal axial line A—A of the drill (see Fig. 2). The upper ledge portion 12 has affixed thereto a shank 11 or the like for reception in a chuck or other holder connected to the driving means such as a motor, flexible shaft or the like, in any convenient manner, as will be readily understood by those skilled in this art.

The lower ledge portion 13 has a tubular stem 16 depending therefrom and connected thereto by a flared collar 17 or the like, said tubular stem 16 terminating in an enlarged terminal ring 18 which is of greater outer diameter than the stem 16, to define therewith a shoulder 19, as will be presently more particularly explained.

The drill is preferably made of metal or any other suitable material, the parts described being either integral or secured together in any desired or convenient manner to provide the structure illustrated in the drawing.

The terminal ring portion 18 of the stem 16 is preferably externally and internally coated with an abrasive material such as diamond dust or other abrasive particles, the abrasive coating being designated in Fig. 4 as 20 and as will be noted from said figure, extending to the shoulder 19 and covering the face 24 of ring 18.

For this purpose, the lower end of the drill may be immersed in a solution containing an abrasive material and an adhesive, the immersion being up to the shoulder portion 19 so that on removing the drill from the solution the adhering coating 20 will cover the outer and inner walls of the terminal ring 18 and the face 24 thereof.

If desired, the stem 16 may be further provided with transverse apertures 21 to assure a supply of air into the axial aperture 22, which extends through the stem proper 16 and the terminal ring 18 thereof, through the flared collar 17 and lower ledge portion 13 of the body 10 of the drill and terminates at the outer face of the ledge portion 13 in substantial alignment with the inner wall 15 of the body portion 10, which defines the shoulder 23 at the point of juncture of the outer surface of the lower ledge portion 13 therewith.

In operation, the drill is usually rotated at high speed and it is found that the terminal ring 18 will cut through the material to be provided with an aperture in a rapid and accurate fashion, providing an aperture of uniform diameter through the body of the material being operated on. The resultant aperture being of uniformity throughout, it does not become necessary to subject the material to further operations or to cover the aperture with washers or other covering members.

The aperture which is formed in the material operated on by said drill will be of substantially equal diameter to the outer diameter of the terminal ring 18 of the drill. The medial portion of the material removed on the forming of the aperture will pass upwardly through the aperture 22 of the drill and outwardly at the point indicated at B at the upper surface of the lower ledge portion 13. The drill is therefore self cleaning, as will be apparent from an inspection of Fig. 4.

The dimensions of the various parts described may be varied as desired, within the scope of this invention.

Fig. 5 is a fragmentary elevational view of the lower end of a drill embodying a modified form of my invention wherein the face 24' of the terminal ring 18' of stem 16' of the drill is provided with serration 25.

Having thus described my invention what I claim as new and desire to secure by Letters Patent, is:

1. A drill comprising a body portion provided with spaced, flat, horizontally disposed ledge portions, an inner wall on said body portion offset from the longitudinal axis thereof and connecting said ledge portions and defining, with the ledge portions, a recessed portion, a shank depending from one of said ledge portions, a tubular stem depending from the other of said ledge portions, and a terminal ring secured to said stem, said drill being provided with an axial aperture through said ring, stem and lower ledge portion, and a coating of abrasive material affixed to the inner and outer walls of said terminal ring and to the outer face thereof.

2. A drill comprising a body portion provided with spaced, flat, horizontally disposed ledge portions, an inner wall on said body portion offset from the longitudinal axis thereof and connecting said ledge portions and defining, with the ledge portions, a recessed portion, a stem depending from one of said ledge portions, and a terminal member secured to said stem, said drill being provided with an axial aperture through said terminal member, stem and lower ledge portion, and a coating of abrasive material affixed to the inner and outer walls of said terminal member and to the outer face thereof.

HARRY J. ESDALE.